(12) United States Patent
Vodegel

(10) Patent No.: US 6,314,193 B1
(45) Date of Patent: Nov. 6, 2001

(54) METHOD AND DEVICE FOR LOCALIZING AND DETECTING PLASTIC STRIPS AND WINDOW AREAS ON MAIL

(75) Inventor: Manfred Vodegel, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,056

(22) Filed: Mar. 19, 1999

(51) Int. Cl.$^7$ ................................................. G06K 9/00
(52) U.S. Cl. ................................................................ 382/101
(58) Field of Search ........................................ 382/100, 101; 209/2, 3, 3.1, 3.2, 509, 535, 536, 546, 547, 900, 938

(56) References Cited

U.S. PATENT DOCUMENTS

| | | | |
|---|---|---|---|
| 4,317,030 | * | 2/1982 | Berghell ................................ 235/489 |
| 4,488,610 | * | 12/1984 | Yankloski ................................ 177/4 |
| 4,554,873 | * | 11/1985 | Rex .................................... 104/88.04 |
| 4,672,681 | * | 6/1987 | Goldkuhle ............................ 382/101 |
| 4,786,941 | * | 11/1988 | Regan .................................. 399/182 |
| 4,886,976 | * | 12/1989 | Tilmie, Jr. ............................ 250/578 |
| 5,331,151 | * | 7/1994 | Cochran et al. ...................... 250/223 |
| 5,339,733 | * | 8/1994 | Malin .................................... 101/91 |
| 5,917,925 | * | 6/1999 | Moore .................................. 382/101 |
| 5,966,457 | * | 10/1999 | Lemelson ............................. 382/141 |
| 6,122,042 | * | 9/2000 | Wunderman et al. ................. 356/73 |
| 6,129,351 | * | 10/2000 | Oohara et al. ........................ 271/262 |

* cited by examiner

Primary Examiner—Andrew W. Johns
Assistant Examiner—Shervin Nakhjavan
(74) Attorney, Agent, or Firm—Casey P. August, Esq.; McGinn & Gibb, PLLC

(57) ABSTRACT

A method and a device for the identification of plastic strips and/or window areas on mail is presented. The problem of dust build-up on the arrangement, causing it to fail, is avoided because the components can be arranged at a sufficient distance from the surface of the mail.

20 Claims, 2 Drawing Sheets

METHOD AND DEVICE FOR LOCALIZING AND DETECTING PLASTIC STRIPS AND WINDOW AREAS ON MAIL

FIELD OF THE INVENTION

The present invention relates to a method for localizing and detecting plastic strips and/or window areas on mail. In particular, the invention relates to a localization method of this kind for large-format envelopes and parcels. The invention also relates to a device for implementing such a method.

BACKGROUND TO THE INVENTION

Mail sorting equipment is in widespread use today. Automated location and detection of addresses on standard envelopes at high throughput rates has long been mastered. In the field of large-format envelopes and parcels (e.g. DIN A4, B4) too there has recently been a development with regard to automated address detection (cf. DE-C-195 32 842).

However, the proportion of such mail being sent vacuum sealed in plastic sheet is steadily increasing. Consequently, the detection of mail enclosed entirely in plastic sheeting or of mail with plastic strip areas—such as a plastic-sheeted window in a standard paper envelope or a label mounted on a plastic strip—is becoming more and more important.

Precise detection of plastic strips and/or areas of plastic is important for the following reasons:

The result of the read operation is often imprinted on the envelope as a barcode. Such barcodes cannot be affixed directly to the plastic, however, as there is a risk of their being blurred. A special label must therefore be affixed to the mail, resulting in additional cost which is avoidable on paper envelopes.

On the other hand, if a label of the said kind and its position on a plastic covering can be localized, the position of the recipient's address or barcode is thereby automatically identified.

The same applies where it is possible to detect a window and its position on a standard paper envelope.

STATE OF THE ART

All currently known plastic strip/window detectors use the amplified total reflection of light on plastic strips and/or the ability of those materials to polarize light when the light is radiated and received at a preferred angle (Brewster angle). In this, the light sender and receiver are arranged perpendicular to the direction of movement of the mail along a line over its entire height. The received light is spatially allocated to the position of the individual sender or receiver and evaluated:

Thus, for example, DE-A-195 35 038 discloses a device and method to detect a label/window position, wherein light-emitting elements illuminate the object conveyed by a conveyor device.

A lens generates an image of the said object, wherein linear image converters convert the image light striking the lens into image signals. Then the image signals are converted by binary conversion into monochrome binary image signals, and on the basis of those binary image signals a label/window position is determined with the aid of a coordinates computation unit.

In DE-C-42 22 908 a device is disclosed which scans the label edges based on a shadowing effect when the mail is illuminated from different directions. In this, the label must lie essentially parallel to the surface of the mail, and be vertically raised or lowered.

Finally, U.S. Pat. No. 4,845,761 discloses a system for determining possible address information, including a light source and detectors to detect the reflection from the mail. The light source consists of a large number of photoemitters (for example light-emitting diodes), of which the reflection is detected by photodetectors (for example phototransistors). Also, a polarizer is used to improve the so-called "specular-to-diffuse" ratio.

Since the light reflected from a specific position of an object (envelope etc.) covers a certain solid angle (approx. 3/100 sr), correct allocation of a received signal with a desired resolution to the location-from which it is reflected is only possible if the sending and receiving elements are mounted so close to the surface of the object being detected that the possibility of overlap of the corresponding light cones of adjacent parts of the object is excluded (a light cone in this context should be understood as being the envelope of all angles into which light is reflected).

Thus, for example, at a desired positional resolution of 5 mm the distance must not be greater than 2–3 cm.

These detectors have the disadvantage that they are heavily contaminated by dust from abrasion of the mail, and so need to be cleaned very frequently. Above all, they incur the risk that plastic strips and window areas will not be detected. Furthermore, these detectors are practically unusable for parcel surfaces, as they have differing heights (mechanical tracking problem) and are very uneven.

It is therefore the object of the present invention to deliver a method and device which permit precise identification of plastic strips and plastic-sheeted window areas, at the same time prevent dust contamination of the arrangement, and also allow the range of applications of such detectors to be expanded to include parcel surfaces.

This and other objects are fulfilled by the method in accordance with claim 1 and the device in accordance with claim 6. Further advantageous embodiments of the inventions are presented in the sub-claims.

The method in accordance with the invent ion offers the advantage that between the sender and receiver and the object being examined a large distance can be ensured, limited only by the aperture. To be able to receive as much light as possible with as little apparatus as possible, it is beneficial—but not limiting—to select a distance from the receiver to the detected object of approximately 30–50 cm. The distance from the sender to the detected object may without any problem be set longer (100 cm and more) when using light with greater coherence length (laser).

The method in accordance with the invention can be applied in the detection of plastic strips, inspection windows and paper labels affixed on plastic, as well as for standard and large-format envelopes and parcels. It is not restricted to those applications, however, but can generally be applied wherever the positions of smooth surfaces need to be distinguished from those of rough surfaces. The method in accordance with the invention can also be applied wherever the positions of smooth (but not necessarily entirely flat) surfaces of electrically non-conductive materials need to be distinguished from those of conductive materials, where the special property of the said materials is used for polarization.

For the sake of clarity, however, the invention is detailed in the following based on the drawing in respect only of the problem of detection of plastic strips and inspection windows. The drawing schematically presents a possible arrangement for implementing the method in accordance with the invention.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE INVENTION

Figure 1:
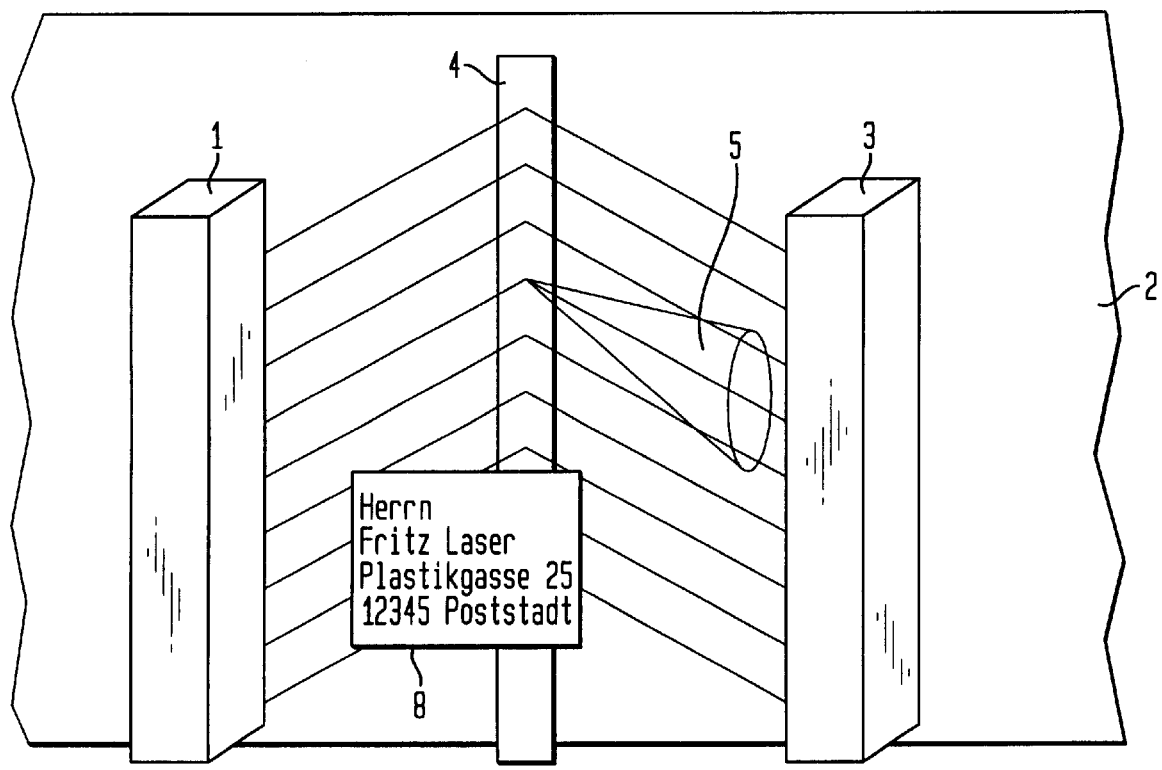
FIG. 1 illustrates a device for localizing and detecting plastic strips and window areas on mail according to the present invention.

FIG. 1 shows a light source (sender) 1 in the form of a strip. The arrangement is not restricted to the strip form. Rather, any arrangement may be selected in which the illumination means are arranged in a line. The light strip 1 is arranged perpendicular to the direction of conveyance of the objects being detected, and includes a large number of individual illumination elements (not shown) arranged at specific intervals along the strip. The number of illumination elements depends on the height of the objects and on the desired resolution. In the present case the light strip consists of approximately 25 to 50 illumination elements arranged at intervals of approximately ½ to 1 cm, wherein the height of the light strip corresponds to the height of the object being detected. An important factor is that the said individual illumination elements are pulsable and focusable. Pulsable means that a specific illumination element can be activated at specific points in time for a specific brief duration. Focusable means that the area illuminated by an illumination element can be restricted to a small diameter (approximately 2–10 mm). Thus flash lamps, LEDs etc. can be used as illumination elements, for example. Laser diodes have proved specially advantageous, since they are very easy to handle and are easy to focus over a large distance.

The detected object 2 (letter envelope, large-format envelope, parcel, etc.) is conveyed past the light strip 1 at a speed of approximately 1 m/s to approximately 5 m/s, preferentially 2.3 m/s. Along the direction of conveyance at a given distance a receiver 3 is arranged, being perpendicular to the direction of conveyance and parallel to the sender 1. The distance of the receiver should be at least 20 to 40 cm for standard letter and large-format envelopes, and for parcels may also be around 1 to 2 meters. The receiver in this case acts in general as a light collector and may, for example, be executed as an optical fiber cross-section converter in the form of a strip. Other arrangements, such as large lenses (Fresnel lenses) or hollow mirrors, can of course also be applied.

As it passes by the object 2 is continuously scanned by activation of illumination elements at specific times, which then each illuminate a specific area of the object. This means that at the specific point in time only one of the illumination elements is throwing light onto the object. The light is reflected by the surface of the object and strikes the receiver 3, where it is detected. The reflected light forms a light cone 5, of which the diameter is greater than the distance between the illumination means. However, since the receiver requires no positional resolution on the object being detected as a result of the time-based allocation to a specific location effected here, it permits spatial overlap of the reflections and thus a greater distance from the object. In this way all illumination elements are activated in succession, so that a scanning area 4 is created on the object 2. If, for example, square pixels are selected, then for laser diodes at intervals of 1 cm for example the entire diode array should have been activated (switched through) in the time in which the object being detected has just moved on one centimeter. The pulse time is preferentially 100–160 μs.

As a result of the conveyor movement during activation, an oblique line of detection points is created on the receiver. This can be compensated, for example, by arranging the illumination strip at an appropriate counter-angle.

When all illumination elements have been activated and the respective reflections detected, the uppermost illumination element is activated again and the above process recommences. In this way the entire object is successively scanned.

Since laser diodes already generate polarized light, in a specially advantageous embodiment of the invention two laser diodes with mutually perpendicular direction of polarization are arranged together on the light strip, both illuminating the same area of the object. This enables activation of two diodes with mutually perpendicular direction of polarization in each case. The two linked diodes are activated as quickly in succession as possible. The preferred time here is approximately half that required in an arrangement without utilization of the polarization, as an optimum illumination period is thereby attained. Light polarized parallel to the surface of the object is heavily reflected by plastic strips, whereas light polarized perpendicular to it is reflected only very weakly. For normal paper surfaces the reflection is therefore virtually identical for perpendicular and parallel polarized light, and the difference is more or less zero. For areas of plastic, however, there is a large difference. The light reflected by a paper surface is thus not dependent on the irradiated polarization, so that no signal difference results. Conversely, the light reflected by a plastic strip (a window) exhibits a high degree of dependence when light is radiated/received close to the Brewster angle. This arrangement thus provides unambiguous detection of plastic areas based on the signal difference.

By differencing of the signals of two laser diodes at the same height level, but with mutually perpendicular direction of polarization, plastic can be distinguished from paper in the scanned area with absolute certainty.

Figure 2:
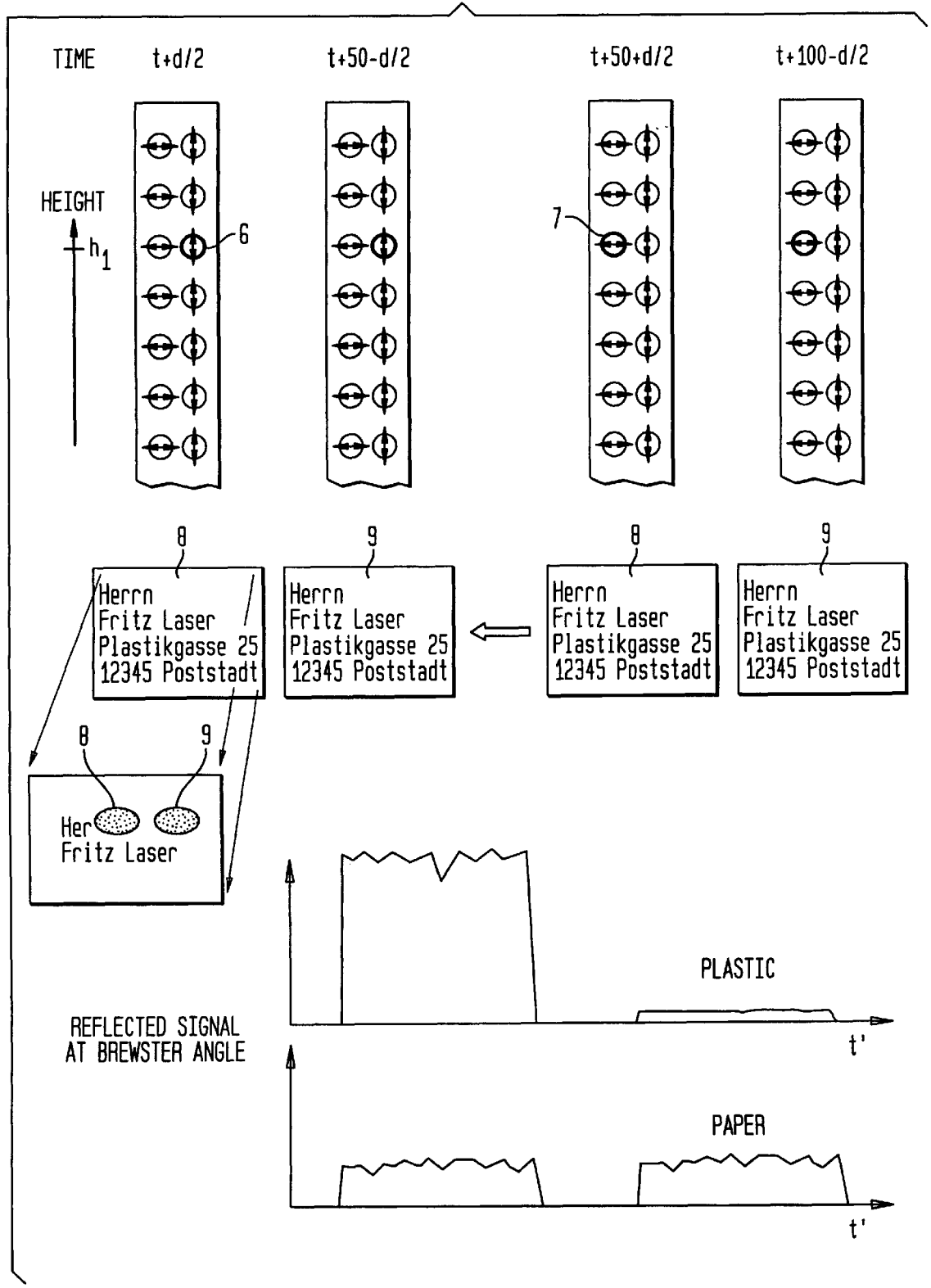
FIG. 2 illustrates a method for localizing and detecting plastic strips and window areas on mail according to the present invention.

FIG. 2 schematically presents the process of scanning an object utilizing the polarization for plastic detection at a fixed height level. As an example, a time span of t+d/2 to t+100−d/2 μs is assumed here (d representing the switchover time from one laser diode to the other), with the movement of the mail item in the direction of the arrow severely exaggerated.

At the time t+d/2 the laser diode 6 is activated at height $h_1$ and illuminates the beginning of the position 8. Its polarization is directed such that a very high reception signal is produced on plastic strip when light is irradiated close to the Brewster angle (approximately 30°). For paper the resulting signal is usually lower, as schematically represented in the curves in FIG. 2.

After the time t+50−d/2 the end of the scanning phase for the (for plastic) highly-reflective polarization is reached. The laser diode 6 is deactivated when the light emitted by it has reached the position 9 on the object.

At t+50+d/2—that is, immediately after deactivation of the first diode 6—the laser diode 7 with polarization perpendicular to the first (at the same height $h_1$) is activated. It is arranged and aligned such that, at this point in time, it essentially illuminates the same area 8 as the diode 6 at the time t+d/2. The reflected signal is substantially lower for plastic, while for a paper envelope there is no dependence on the direction of polarization (identical signal).

At the time t+100−d/2 scanning by the second laser diode 7 is terminated. It essentially covered the area of positions 8, 9 of the object, as the first diode 6.

As a result of differencing between the signals of the diodes 6 and 7 at the same height level $h_1$, but with mutually perpendicular direction of polarization, plastic can be distinguished from paper in the scanned area with absolute certainty.

What is claimed is:

1. Method of identifying plastic strips and/or window areas on mail, comprising:

illuminating said mail using a plurality of illumination elements;

detecting a polarization of light reflected by said mail;

identifying a surface of said mail based on said polarization, wherein at a given point in time only one of said plurality of illumination elements is activated.

2. Method in accordance with claim 1, wherein said illumination elements are arranged in a line perpendicular to a direction of conveyance of said mail.

3. Method in accordance with claim 2, wherein said illumination elements are activated in succession along said line.

4. Method in accordance with claim 1, wherein said illumination elements comprise laser diodes.

5. Method in accordance with claim 4, wherein said illumination elements comprise two laser diodes with mutually perpendicular direction of polarization which essentially illuminate a same area of said mail and are activated in succession.

6. Method in accordance with claim 5, wherein a differential signal between said two laser diodes is used to detect plastic strips.

7. Method in accordance with claim 1, wherein said surface comprises one of paper and plastic.

8. Method in accordance with claim 1, wherein said illumination elements are pulsable and focusable.

9. Method in accordance with claim 1, wherein an individual illumination element of said plurality of illuminations elements is selectively activated at a specific point in time for a specific duration.

10. Method in accordance with claim 1, wherein an area illuminated by an individual illumination element of said plurality of illumination elements is selectively restricted to a small diameter.

11. Method in accordance with claim 1, wherein said detecting uses one of an optical fiber cross-section converter in a form of a strip, Fresnel lenses, and hollow mirrors.

12. Method in accordance with claim 1, wherein light polarized parallel to said surface is heavily reflected by plastic and light polarized perpendicular to said surface is weakly reflected by plastic.

13. Method in accordance with claim 1, wherein light polarized parallel to said surface and light polarized perpendicular to said surface are substantially identically reflected by paper.

14. Device for identifying a surface on mail, comprising a plurality of illumination elements for illuminating mail; and a detecting element for detecting a polarization of light reflected from said mail, wherein only one illumination element can be activated at a time.

15. Device in accordance with claim 7, wherein said illumination elements comprise laser diodes.

16. Device in accordance with claim 7, wherein said illumination elements are arranged in a line perpendicular to a direction of conveyance of said mail.

17. Device in accordance with claim 16, wherein said illumination elements are activated in succession along said line.

18. Device in accordance with claim 16, wherein each of said illumination elements comprises two laser diodes with mutually perpendicular direction of polarization, arranged in immediate proximity to each other.

19. Device in accordance with claim 7, wherein light polarized parallel to said surface is heavily reflected by plastic and light polarized perpendicular to said surface is weakly reflected by plastic.

20. Device in accordance with claim 7, wherein light polarized parallel to said surface and light polarized perpendicular to said surface are substantially identically reflected by paper.

* * * * *